(12) United States Patent
Solondz

(10) Patent No.: US 6,862,447 B1
(45) Date of Patent: Mar. 1, 2005

(54) METHOD OF MAKING DOWNLINK OPERATIONAL MEASUREMENTS IN A WIRELESS COMMUNICATION SYSTEM

(75) Inventor: Max Aaron Solondz, Morris Township, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/250,287

(22) Filed: Feb. 16, 1999

(51) Int. Cl.[7] .................................................. H04Q 7/20
(52) U.S. Cl. .................. 455/423; 455/424; 455/517; 455/456.2; 455/437; 455/439; 455/67.11; 455/67.14; 455/524; 455/442; 455/561; 342/450; 342/463
(58) Field of Search ............................. 455/456, 437, 455/67.11, 67.14, 423, 424, 561, 560, 439, 442, 456.2, 524, 517, 67.1; 342/450, 463

(56) References Cited

U.S. PATENT DOCUMENTS

| | | | |
|---|---|---|---|
| 5,594,949 A | | 1/1997 | Andersson et al. |
| 5,602,903 A | * | 2/1997 | Leblanc et al. ............... 379/60 |
| 5,634,192 A | | 5/1997 | Meche et al. |
| 5,697,055 A | | 12/1997 | Gilhousen et al. |
| 5,710,980 A | * | 1/1998 | Ueda ....................... 455/67.14 |
| 5,710,981 A | * | 1/1998 | Kim et al. ..................... 455/69 |
| 5,854,981 A | * | 12/1998 | Wallstedt et al. ........... 455/439 |
| 5,926,469 A | * | 7/1999 | Norstedt et al. ............ 370/329 |
| 5,960,341 A | * | 9/1999 | Leblanc et al. ............. 455/426 |
| 5,966,657 A | * | 10/1999 | Sporre ......................... 455/425 |
| 5,995,500 A | * | 11/1999 | Ma et al. .................... 370/337 |
| 6,044,270 A | * | 3/2000 | Raith .......................... 455/434 |
| 6,104,933 A | * | 8/2000 | Frodigh et al. ............ 455/522 |
| 6,122,505 A | * | 9/2000 | Genell et al. ............... 455/423 |
| 6,708,041 B1 | * | 3/2004 | Butovitsch et al. ......... 455/522 |

FOREIGN PATENT DOCUMENTS

| | | |
|---|---|---|
| EP | 0752766 | 1/1997 |
| WO | 9900999 | 1/1999 |

* cited by examiner

*Primary Examiner*—Marceau Milord

(57) ABSTRACT

In the method of making downlink operational measurements a measurement request from one of a main controller and a first base station is sent to at least a second base station. The measurement request requests the second base station to instruct mobile terminals in communication therewith to make operation measurements of at least one signal transmitted by the first base station. The second base station transmits a measurement instruction to the mobile terminals in communication therewith in response to the measurement request. The measurement instruction instructs the mobile terminals in communication with the second base station to make operational measurements of the signal transmitted from the first base station. Then the second base station receives results of the operational measurements from the mobile terminals in communication therewith. Alternatively or in addition, the second base station makes the operational measurements.

24 Claims, 4 Drawing Sheets

METHOD OF MAKING DOWNLINK OPERATIONAL MEASUREMENTS IN A WIRELESS COMMUNICATION SYSTEM

BACKGROUND OF THE INVENTION

1. Field of the Invention

The present invention relates to a wireless communication system; and more particularly, a method of making downlink operational measurements in a wireless communication system.

2. Description of Related Art

Conventional wireless communication systems include a plurality of cell sites, each having a base station sending and receiving signals over one or more associated antenna systems. Accordingly, each base station has one or more coverage areas (geographic areas in which a mobile terminal will communicate with the base station) associated therewith and collectively called a cell. The number of coverage areas associated with a base station depends on the design of the cell site including that base station. The cell site could include an omni-directional antenna system (azimuth angle of 360 degrees), and provide a single coverage area. Alternatively, the cell site could include a multi-sector antenna system and provide a number of coverage areas. For instance a three-sector antenna system (azimuth angle of 120 degrees) provides three coverage areas commonly referred to as sectors. Therefore, a single base station may transmit and receive the signals associated with more than one coverage area.

Operators of a wireless communication system monitor the quality of system performance by taking operational measurements indicative thereof. These operational measurements represent the quality of uplink communication, communication from a mobile terminal to the base station, and the quality of the downlink communication, communication from the base station to a mobile terminal. Instead of uplink and downlink, the terms reverse and forward, respectively, are common in the art. The downlink operational measurements include, but are not limited to, signal strength of a signal received from a base station, signal-to-noise or signal-to-noise plus interference ratios of signals received from a base station, bit error and frame error rates of signals received from a base station, etc.

Techniques exist, such as in mobile assisted hand-off (MAHO), for a base station to originate a request that mobile terminals in communication with the base station make some operational measurements of downlink signals received from the base station, or downlink signals received from the base station and other base stations. A mobile terminal in communication with a base station is in one of two states: (1) registered with the base station and monitoring a forward or set-up channel of the base station (e.g., a set-up channel in the Advanced Mobile Phone System, a Digital Control CHannel in the North American Time-Division Multiple Access System, the Broadcast Control Channel in the Global System for Mobiles, a paging channel in a Code-Division Multiple Access system, etc.); or (2) in an active call on a devoted traffic channel served by the base station. Accordingly, in MAHO, a base station originates a request, to mobile terminals in a coverage area associated therewith, that the mobile terminals make operational measurements of downlink signals from the base station and, perhaps, surrounding base stations as well. These measurements are then used in the hand-off determination process of MAHO.

Another conventional technique for making downlink operational measurements is referred to as drive testing. In drive testing, one or more test receiver is deployed at known measurement locations within the coverage areas of a base station, and operational measurements are made of downlink signals from that base station.

Also, many wireless communication systems include a test radio at each base station to perform a self test operation. The test radio mimics the functions of a mobile terminal to test whether the base station is transmitting and receiving signals properly.

While these techniques provide information about the downlink signals within the coverage areas of the base station of interest, the techniques do not provide information regarding the impact of the downlinks signals from one base station on the quality of system performance in coverage areas of another base station. Furthermore, existing techniques like drive testing make downlink operational measurements in a complex and costly manner.

SUMMARY OF THE INVENTION

The method of making downlink operational measurements according to the present invention uses the mobile terminals in the coverage areas of other base stations or uses the other base stations to make operational measurements of signals transmitted by a base station of interest. The other base stations themselves make or instruct the mobile terminals in their coverage areas to make the operational measurements in response to a request from the base station of interest or a main controller, which is connected to the other base stations and the base station of interest.

As a result, the method according to the present invention provides information regarding the impact of the downlink signals from one base station on the quality of system performance in coverage areas of another base station, and does not involve the complex and costly process of deploying test equipment to make downlink operational measurements. Instead, by using the existing capabilities and infrastructure of the wireless communication system, downlink operational measurements are made in a simple and inexpensive manner.

BRIEF DESCRIPTION OF THE DRAWINGS

The present invention will become more fully understood from the detailed description given below and the accompanying drawings which are given by way of illustration only, wherein like reference numerals designate corresponding parts or steps in the various drawings, and wherein.

DETAILED DESCRIPTION OF THE PREFERRED EMBODIMENTS

Wireless Communication System

Figure 1:
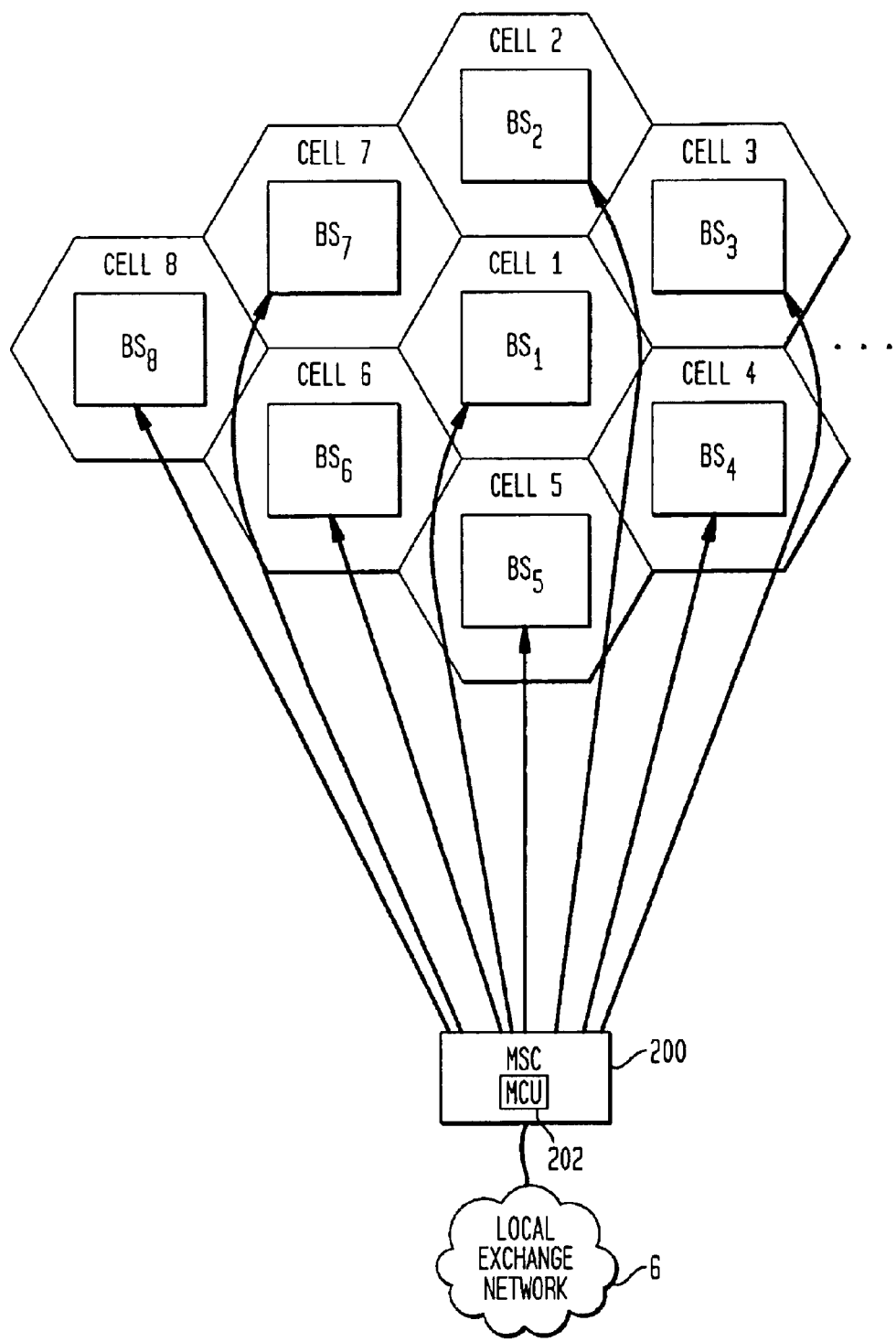
FIG. 1 illustrates a wireless communication system according to the present invention.

FIG. 1 illustrates a wireless communication system according to the present invention. As shown, a plurality of cells Cell 1, Cell 2, . . . each include a base station BS1, BS2, . . . , respectively. For clarity of illustration, the antenna system associated with each base station BS1, BS2, . . . has not been shown. A mobile switching center (MSC) 200 communicates with each base station BS1, BS2, . . . and a local exchange network 6. The local exchange network 6 represents networks over which voice and/or data are communicated such as the Public Switched Telephone Network, the Integrated Service Digital Network, the internet, other internet protocol network, etc. The MSC 200 is any well-known MSC except for the addition of a main control unit (MCU) 202. However, the MCU 202 does not need to form part of the MSC 200, and instead, can be formed separately and even be located remotely from the MSC 200. The MCU 202 is a data processing system programmed to operate as described in detail below, and, which when formed as part of the MSC 200, utilizes the memory and user interfaces supplied by the MSC 200. When provided separately from the MSC 200, the MCU 202 includes a user interface, memory, and an interface for interfacing with the MSC 200.

Operation of the Wireless Communication System

The operation of the wireless communication system according to a first embodiment of the present invention will be described with respect to the flow chart illustrated in FIG. 2. As shown, in step S10 a base station of interest or the MCU 202 generates a measurement request. The measurement request indicates the downlink operational measurement or measurements to be made, identifies the base stations which should receive the measurement request (hereinafter the "identified base stations"), and identifies the signal transmitted by the base station of interest to measure.

Preferably, the identified signal is a signal transmitted at a constant power level. Accordingly, in a Time-Division Multiple Access (TDMA) system, the identified signal is preferably a digital control channel; in Global System for Mobiles (GSM), the identified signal is preferably a broadcast control channel; and in a Code-Division Multiple Access (CDMA) system, the identified signal is preferably the pilot signal.

Alternatively, a dummy or reserve channel could be turned on by the base station of interest to serve as the identified signal for the duration of the measurement process. In another alternative, an existing channel (e.g., a traffic channel) could be locked at constant power for the duration of the measurement process and serve as the identified signal.

If the cell sites of the wireless communication system include a multi-sector antenna system, then the measurement request also identifies which sector or sectors of an identified base station in which the measurements should be made. The identified sectors could, therefore, include a sector or sectors of the base station of interest other than the sector associated with the identified signal.

The measurement request may be entered by an operator at the user interface of either the base station of interest or the MCU 202. Alternatively, generating the measurement request or a portion thereof may be automated. For example, the operational measurements and identified base stations could be predetermined for a particular attribute of system performance. Accordingly, the measurement request is generated automatically by simply requesting the data for the attribute of system performance, a base station of interest and a sector of interest if the cell sites include a multi-sector antenna system. Numerous other modifications and alternatives for generating the measurement request will be readily apparent from the foregoing and following disclosure.

Next, if the base station of interest generates the measurement request, the base station of interest sends the measurement request to the MCU 202. Then, whether generated by the base station of interest or the MCU 202, the measurement request is routed by the MCU 202 to the base stations identified in the measurement request in step S15.

The identified base stations then send a measurement instruction to the mobile terminals in communication therewith in step S20. As discussed previously, a mobile terminal in communication with a base station is in one of two states: (1) registered with the base station and monitoring a forward or set-up channel of the base station; or (2) in an active call on a devoted traffic channel served by the base station.

If the cell sites of the wireless communication system include multi-sector antennas, then in step S20, the identified base stations send the measurement instructions to the mobile terminals in communication therewith and in the coverage area or areas identified in the measurement request. The measurement instruction instructs the mobile terminals to make operational measurements for the signal transmitted by the base station of interest as identified in the measurement request.

Subsequently, in step S25, the mobile terminals receiving the measurement instruction make the operational measurements indicated therein for the identified signal. As is known, a TDMA system shares the use of an RF channel across multiple users. In TDMA, mobile terminals communicate with the base station during small packets of time called slots. A mobile terminal is only permitted to communicate with a base station during certain slots. Off-time slots are slots during which a mobile terminal is not permitted to communicate with the base station. When the present invention is applied to a TDMA system, the mobile terminals, preferably, make the operational measurements during their off-time slots. It will be appreciated from the foregoing and following disclosure that the operational measurements may be made in a similarly efficient manner in other types of wireless communication systems.

Because the process of making downlink operational measurements at a mobile terminal is well-known, this will not be described. The mobile terminals making the operational measurements send the results of those measurements to their respective identified base stations in step S30. The identified base stations then send, in step S35, the received results to the MCU 202.

As indicated by the dashed line between step S35 and step S40, the MCU 202 optionally sends the received results to the base station of interest.

Accordingly, by using the existing mobile terminals being served by the wireless communication system, downlink operational measurements are made in coverage areas outside that served by the base station making the request for measurement of a signal transmitted thereby. Alternatively, the downlink measurements are made at the request of the MCU 202. Either way, the complex and costly process of deploying test equipment is avoided.

Figure 3:
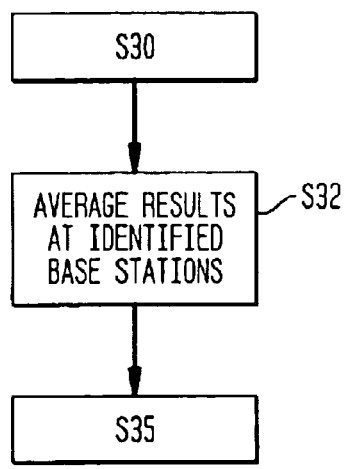
FIG. 3 illustrates a modification of the flowchart shown in FIG. 2.

FIG. 3 illustrates a modification of the method of making operational measurements according to the present invention. As shown in FIG. 3, a further step S32 is performed between steps S30 and S35. In step S32, for each operational measurement that the measurement request indicates to make, each identified base station averages the received results. Accordingly, in step S35, the identified base stations send the calculated average value to the MCU 202.

Figure 4:
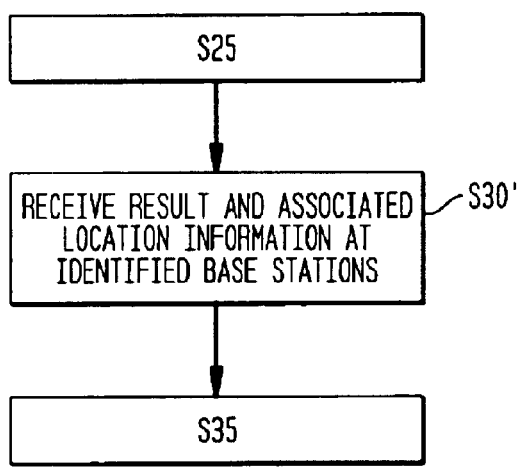
FIG. 4 illustrates another modification of the flowchart shown in FIG. 2.

FIG. 4 illustrates another modification to the method of making operational measurements according to the present invention. The modification of FIG. 4 applies to wireless communication systems wherein the mobile terminals include a location detection device such as a global positioning sensor (GPS).

Figure 2:
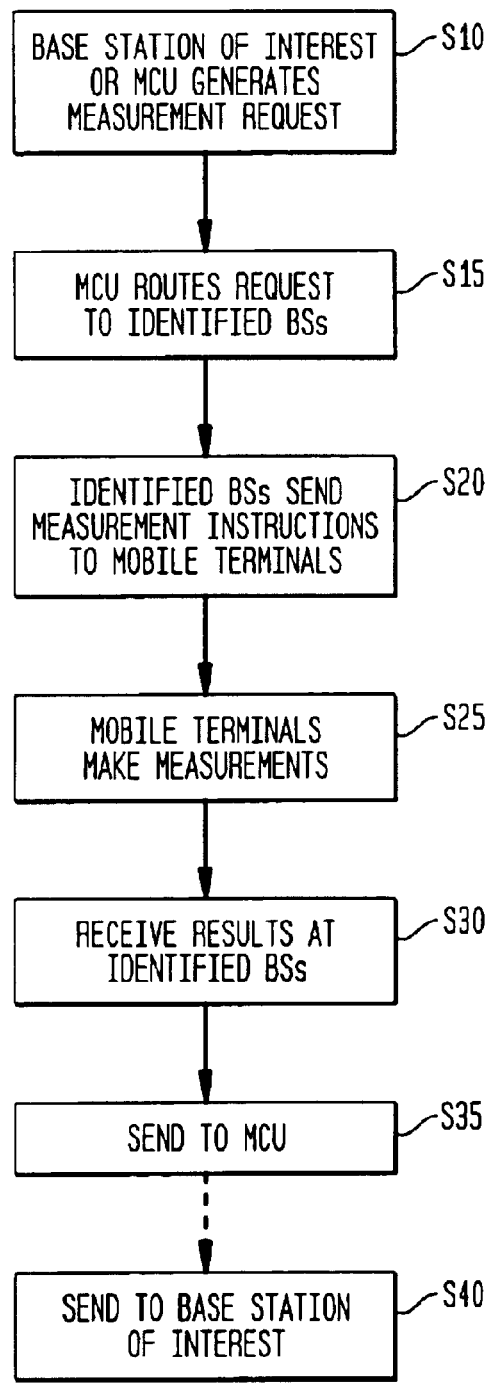
FIG. 2 illustrates a flow chart for an embodiment of the method of making operational measurements according to the present invention.

As shown in FIG. 4, a new step S30' replaces step S30 of FIG. 2. In step S30', the mobile terminals making the operational measurements send the results of those measurements to their respective identified base stations along with their location. Namely, each operational measurement from a mobile terminal has location information associated therewith. Accordingly, in step S35, the identified base stations send the received results and associated location information to the MCU 202. The MCU 202 may then create a map of the received results based on the location information associated with each measurement result.

Figure 5:
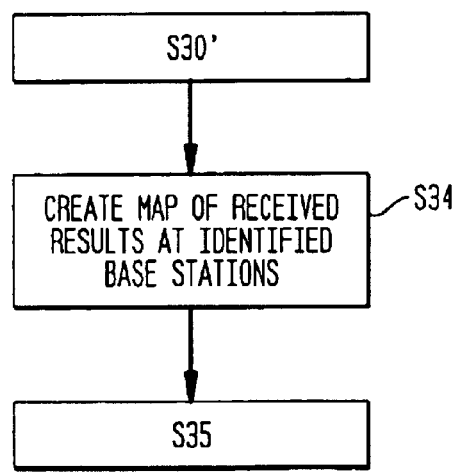
FIG. 5 illustrates a further modification of the flow chart shown in FIG. 2 as modified according to FIG. 4.

FIG. 5 illustrates a further modification of the method of making operational measurements as modified according to FIG. 4. As shown in FIG. 5, a new step S34 is performed between steps S30' and step S35. In step S34, for each operational measurement that the measurement request indicates to make, each identified base station creates a map of the received result for the operational measurement based on the location information associated with each measurement result. Accordingly, in step S35, the identified base stations send the created maps to the MCU 202.

Figure 6:
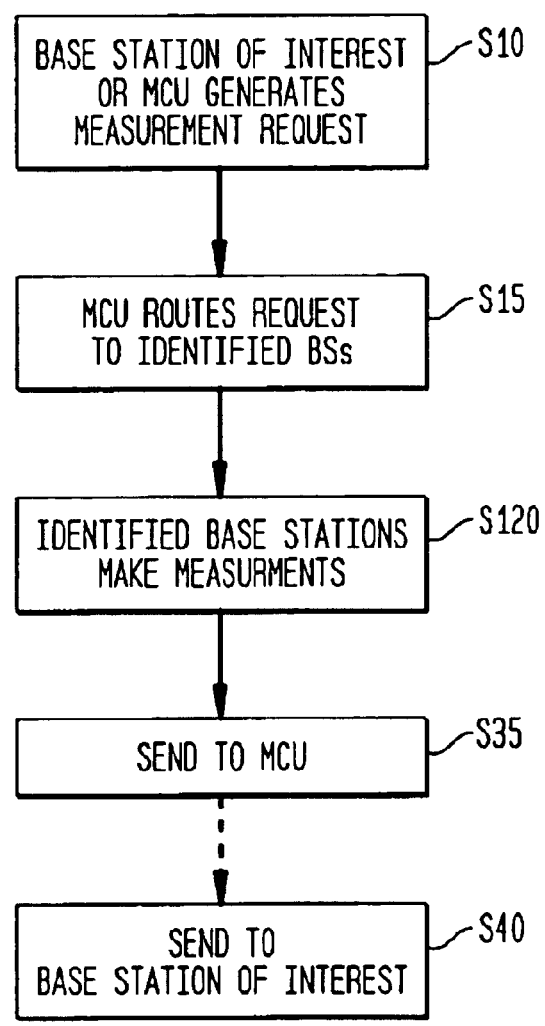
FIG. 6 illustrates a flow chart for another embodiment of the method of making operational measurements according to the present invention.

FIG. 6 illustrates a flow chart for another embodiment of the method of making operational measurements according to the present invention. As shown, steps S10 and S15 as discussed above are performed. Then, in step S120, the identified base stations make the operational measurements themselves as indicated in the measurement request. Namely, the identified base stations tune in the signal, as identified in the measurement request, transmitted by the base station of interest. Some wireless communications systems, such as TDMA system, may be able to perform this tuning operation using the existing self test capabilities of the system. However, the existing capabilities of other wireless communication systems, such as CDMA, can not perform such a tuning operation. Using CDMA as an example, a special purpose radio for tuning in signals transmitted by other base stations has to be added to each base station.

Because the position of each base station in a wireless communication system is known, when the MCU 202 receives the measurement results from the identified base stations in step S35, the MCU 202 can create a map of those results. As further shown in FIG. 6, the MCU 202 may, optionally, send the received results to the base station of interest in step S40.

Accordingly, as with the method of FIG. 2, the method of FIG. 6 avoids the complex and costly process of deploying test equipment, and provides information regarding the impact of downlink signals from one base station on the quality of system performance in coverage areas of another base station.

Furthermore, instead of being an alternative to the method of FIG. 2, the method of FIG. 6 may be used in cooperation therewith.

The methods according to the present invention are applicable to any wireless communication system such as a time-division multiple access system, a code division multiple access system, an analog system, etc.

I claim:

1. A method of making operational measurements in a wireless communication system, comprising:
    a) sending a measurement request from a first base station to at least a second base station, said measurement request requesting said second base station to instruct mobile terminals in communication with said second base station to make operational measurements of at least one signal transmitted by said first base station;
    b) transmitting a measurement instruction from said second base station to said mobile terminals in communication with said second base station in response to said measurement request, said measurement instruction instructing said mobile terminals in communication with said second base station to make operational measurements of said signal transmitted from said first base station; and
    c) receiving results of said operational measurements at said second base station from said mobile terminals in communication with said second base station.

2. The method of claim 1, further comprising:
    d) sending said received results to a main controller.

3. The method of claim 1, further comprising:
    d) processing said received results; and
    e) sending said processed received results to a main controller.

4. The method of claim 3, wherein said step d) averages said received results.

5. The method of claim 3, wherein
    said step c) receives results of said operational measurements and location information indicating a location of said mobile terminal taking each operational measurement; and
    said step d) creates a map of said received results based on said location information.

6. The method of claim 1, wherein said step c) receives results of said operational measurements and location information indicating a location of said mobile terminal taking each operational measurement.

7. The method of claim 1, wherein said signal transmitted from said first base station is transmitted at a constant power level.

8. The method of claim 7, wherein said signal transmitted from said first base station is a forward control channel signal.

9. The method of claim 7, wherein said wireless communication system is a code-division multiple access system and said signal transmitted from said first base station is a pilot signal.

10. The method of claim 7, wherein said signal is one of a reserved or dummy channel.

11. The method of claim 7, wherein said signal is an existing channel held at a constant power level.

12. The method of claim 1, further comprising:
    d) making said operational measurements at said mobile terminals in communication with said second base station during off time-slots of said mobile terminals in communication with said second base station in response to said measurements instruction.

13. The method of claim 1, wherein
    said step a) sends a measurement request from said first base station to said second base station via a main controller, said measurement request instructing said main controller to send said measurement request to said second base station.

14. The method of claim 1, wherein said operational measurements include at least one of signal strength, signal-to-noise ratio, frame error rate and bit error rate of said signal transmitted from said first base station as received at said mobile terminals in communication with said second base station.

15. A method of making operational measurements in a wireless communication system, comprising:
   a) sending a measurement request from a first base station to a plurality of base stations, said measurement request requesting said plurality of base stations to make operational measurements of a signal transmitted by said first base station; and
   b) making said operational measurements at said plurality of base stations.

16. The method of claim 15, further comprising:
   c) sending results of said operational measurements to a main controller.

17. The method of claim 15, wherein said signal transmitted from said first base station is transmitted at a constant power level.

18. The method of claim 17, wherein said signal transmitted from said first base station is a forward control channel signal.

19. The method of claim 17, wherein said wireless communication system is a code-division multiple access system and said signal transmitted from said first base station is a pilot signal.

20. The method of claim 17, wherein said signal is one of a reserved or dummy channel.

21. The method of claim 17 wherein said signal is an existing channel held at a constant power level.

22. The method of claim 15, wherein
   said step a) sends said measurement request from said first base station to said second base station via a main controller, said measurement request instructing said main controller to send said measurement request to said plurality of base stations.

23. The method of claim 15, wherein said operational measurements includes at least one of signal strength, signal-to-noise ratio, frame error rate and bit error rate of said signal transmitted from said first base station as received at said plurality of base stations.

24. The method of claim 15, further comprising:
   c) sending results of said operational measurements to the first base station.

* * * * *